US006695778B2

(12) United States Patent
Golland et al.

(10) Patent No.: US 6,695,778 B2
(45) Date of Patent: Feb. 24, 2004

(54) METHODS AND SYSTEMS FOR CONSTRUCTION OF ULTRASOUND IMAGES

(75) Inventors: Polina Golland, Cambridge, MA (US); Stacy Ho, New Braunfels, TX (US)

(73) Assignee: AITech, Inc., Cambridge, MA (US)

( * ) Notice: Subject to any disclaimer, the term of this patent is extended or adjusted under 35 U.S.C. 154(b) by 0 days.

(21) Appl. No.: 10/190,079

(22) Filed: Jul. 3, 2002

(65) Prior Publication Data

US 2004/0006271 A1 Jan. 8, 2004

(51) Int. Cl.[7] .................................. A61B 8/00
(52) U.S. Cl. .................. 600/437; 600/443; 128/916
(58) Field of Search ................... 600/437–472; 367/7, 11, 130, 138; 128/916; 73/620–633

(56) References Cited

U.S. PATENT DOCUMENTS

| | | |
|---|---|---|
| 4,456,982 A | 6/1984 | Tournois |
| 4,893,284 A | 1/1990 | Magrane |
| 5,339,282 A | 8/1994 | Kuhn et al. |
| 5,628,320 A | 5/1997 | Teo |
| 5,720,708 A | 2/1998 | Lu et al. |
| 5,851,187 A | 12/1998 | Thomas, III et al. |
| 5,873,830 A | 2/1999 | Hossack et al. |
| 6,048,315 A | 4/2000 | Chiao et al. |
| 6,104,673 A | 8/2000 | Cole et al. |
| 6,110,116 A | 8/2000 | Wright et al. |
| 6,213,947 B1 | 4/2001 | Phillips |
| 6,245,016 B1 | 6/2001 | Daft et al. |
| 6,264,609 B1 | 7/2001 | Herrington et al. |
| 6,309,356 B1 | 10/2001 | Ustuner et al. |

OTHER PUBLICATIONS

Nikolov, S. I. et al., "Comparison Between Different Encoding Schemes for Synthetic Aperture Imaging", SPIE Medical Imaging Meeting for Ultrasonic Imaging and Signal Processing, Proceedings of SPIE (2002).

Kiymik, M. K. et al., "Ultrasound Imaging Based on Multiple Beamforming with Coded Excitation", Signal Processing, 58:107–113 (1997).

Shen, J. et al.; "A New Coded–Excitation Ultrasound Imaging System—Part I: Basic Principles"; IEEE Transactions on Ultrasonics, Ferroelectrics, and Frequency Control; 43:1:131–140 (Jan. 1996).

(List continued on next page.)

Primary Examiner—Ali M. Imam
(74) Attorney, Agent, or Firm—Thomas J. Engellenner; Reza Mollaaghababa; Nutter McClennen & Fish, LLP

(57) ABSTRACT

The present invention provides methods and systems for generating ultrasound images of a plurality of scatterers disposed in a target region. More particularly, a method of the invention derives model response functions for each of a plurality of transducers for a given distribution of scattering media. The interrogation pattern can be selected to include a set of unfocused ultrasound waves generated by one or more of the transducers. The interrogation pattern is transmitted into the target region, and the transducers are utilized to detect echoes generated by the scatterers in the target region in response to the interrogation pattern. The methods and systems of the invention advantageously allow obtaining ultrasound images of a target region without employing beamforming either in transmission of ultrasound waves into the region or in detection of echoes generated by scatterers in the target region in response to the transmitted waves.

46 Claims, 10 Drawing Sheets

OTHER PUBLICATIONS

Shen, J. et al.; "A New Coded–Excitation Ultrasound Imaging System—Part II: Operator Design"; IEEE Transactions on Ultrasonics, Ferroelectrics, and Frequency Control; 43:1:141–148 (Jan. 1996).

Karaman M. et al.; "Synthetic Aperture Imaging for Small Scale Systems"; IEEE Transactions on Ultrasonics, Ferroelectrics, and Frequency Control; 42:3:429–442 (May 1995).

Li, Pai–Chi et al.; "A New Filter Design Technique for Coded Excitation Systems"; IEEE Transactions on Ultrasonics, Ferroelectrics, and Frequency Control; 39:6:693–699 (Nov. 1992).

O'Donnell, M.; "Coded Excitation System for Improving the Penetration of Real–Time Phased–Array Imaging Systems"; IEEE Transactions on Ultrasonics, Ferroelectrics, and Frequency Control; 39:3:341–351 (May 1992).

Jaffe, J. S. et al., "Multibeam Imaging Using Spatially Variant Insonification", J. Acoust. Soc. Am., 83:4:1458–1464 (Apr. 1988).

Busse, L. J.; "Three–Dimensional Imaging Using a Frequency–Domain Synthetic Aperture Focusing Technique"; IEEE Transactions on Ultrasonics, Ferroelectrics, and Frequency Control; 39:2:174–179 (Mar. 1992).

"Progress in Medical Imaging" (Newhouse, V. L. ed., Springer–Verlag New York Inc., 1988).

Shen, Jian and Ebbini, Emad. "Filter–Based Coded–Excitation System for High–Speed Ultrasonic Imaging." IEEE Transactions on Medical Imaging, vol. 17, No. 6, Dec. 1998. pp. 923–924.

Chiao, Richard, Thomas, Lewis, and Silverstein, Seth. "Sparse Array Imaging with Spatially–Encoded Transmits." 1997 IEEE Ultrasonics Symposium. pp. 1679–1682.

Hazard, Christopher and Lockwood, Geoffrey. "Theoretical Assessment of a Synthetic Aperture Beamformer for Real–Time 3–D Imaging." IEEE Transactions on Ultrasonics, Ferroelectrics, and Frequency Control, vol. 46, No. 4, Jul. 1999. pp. 972–979.

Lockwood, Geoffrey, Talman, James and Brunke, Shelby. "Real–Time 3–D Ultrasound Imaging Using Sparse Synthetic Aperture Beamforming." IEEE Transactions on Ultrasonics, Ferroelectrics, and Frequency Control, vol. 45, No. 4, Jul. 1998. pp. 980–988.

$$s = \begin{bmatrix} s_1 & s_2 & \cdots & s_V \end{bmatrix}$$

$$B = \begin{bmatrix} B_{11}[1] & B_{11}[2] & \cdots & B_{11}[K] & B_{21}[1] & \cdots & B_{21}[K] & \cdots & B_{N1}[K] \\ B_{12}[1] & & & & & & & & B_{N2}[K] \\ \vdots & & & & & & & & \vdots \\ B_{1V}[1] & & & & & & & & B_{NV}[K] \end{bmatrix} \Rightarrow B = \begin{bmatrix} B_1 & B_2 & \cdots & B_N \end{bmatrix}$$

$$f = \begin{bmatrix} f_1[1] & f_1[2] & \cdots & f_1[K] & f_2[1] & \cdots & f_2[K] & \cdots & f_M[K] \end{bmatrix}$$

FIGURE 2

$$B^T = \begin{bmatrix} B_{11}[1] & B_{11}[2] & \cdots B_{11}[K] & B_{21}[1] & \cdots B_{21}[K] & \cdots B_{N1}[K] \\ B_{21}[1] & & & & & & \\ \vdots & & & & & & \\ B_{1N}[1] & B_{1N}[2] & \cdots B_{1N}[K] & & & & \cdots B_{NN}[K] \end{bmatrix}$$

$$\Rightarrow \begin{bmatrix} B_1^T \mid B_2^T \mid \cdots \mid B_N^T \end{bmatrix}$$

$$s \triangleq Af \quad A: (B^TB)^{-1}B^T \Rightarrow \begin{bmatrix} (B^TB)^{-1}B_1^T \mid (B^TB)^{-1}B_2^T \mid \cdots \mid (B^TB)^{-1}B_N^T \end{bmatrix}$$

FIGURE 3

METHODS AND SYSTEMS FOR CONSTRUCTION OF ULTRASOUND IMAGES

BACKGROUND

The present invention relates generally to methods and systems for obtaining ultrasound images, and more particularly, to such methods and systems that provide real-time ultrasound images having clinical quality.

An ultrasound system can typically include a transducer array, a signal processing unit and a display. The transducer elements generate ultrasonic waves, transmit the waves into a region to be imaged, and receive returning echoes, generated in response to the transmitted waves, by one or more scatterers in the region. The signal processing unit utilizes the echoes to construct an image of the scatterers, which can then be presented to a viewer on the display.

In traditional ultrasound systems, narrow beams are employed for image acquisition. In many such systems, the transducer elements transmit identically-shaped pulse signals which are delayed relative to each other to ensure that the pulses arrive at a desired focal point at the same time, thus forming a beam in a particular direction. During the receiving step, the echoes generated in response to the pulses are similarly delayed so that at any particular time, the echo signals sent by the transducers to the processing unit correspond to signals generated at the same point along the beam. The image values corresponding to scatterers located along the beam direction are set to the sum of the intensities of the respective echo signals. This procedure is often referred to as "delay-and-sum", or "beamforming". An image of a selected region is constructed by repeating this process along a number of transmitted beam directions. The system component, typically hardware, that performs delaying and adding of the echo signals to isolate the scatter properties in a particular location is called a "beamformer".

In most traditional ultrasound systems, the transducer elements are arranged along a single straight or curved line, which confines the transmitted waves to an imaging plane. A resulting image corresponds to a cross-section of an imaged object along the imaging plane. More recently, matrix (2-dimensional) transducer arrays have been introduced that allow full volumetric imaging. Alternatively, a linear array can be moved/rocked to transmit pulses in all directions in a given volume.

The data collection time in the systems described above is proportional to the number of beams required to generate the image. The number of beams required to generate a volumetric image is equal to the square of the number of beams required to form a planar image of the same resolution. For example, to extend a two-dimensional 64-beam image into three dimensions (3D) while maintaining the same resolution, 64×64=4,096 beams are needed. Similarly, extending a 128-beam image into 3D requires 128×128=16,384 beams. Hence, a transition from planar to volumetric imaging can result in approximately two orders of magnitude increase in the amount of data and the acquisition time. Since the time of each transmit-receive iteration (i.e., transmitting a single beam and receiving the echoes from the scatterers in the selected region) is determined by the speed of sound in the region to be imaged (e.g., tissue), the number of beams that the system can transmit and receive in any given time is inherently limited (approximately 5000 per second). At real-time frame rates (e.g., 30 frames per second), this corresponds to approximately 150 beams per image, which is insufficient for volumetric imaging.

Thus, there is a need for improved ultrasound imaging methods and associated systems. There is also a need for such ultrasound imaging methods and systems that allow efficiently generating ultrasound images in real-time.

SUMMARY OF THE INVENTION

The invention provides a method of generating an ultrasound image of a plurality of scatterers disposed in a target region by constructing response functions for each of a plurality of transducers for a given ultrasound interrogation pattern and a given distribution of scattering media. The interrogation pattern can be selected to include a set of unfocused ultrasound waves generated by one or more of the transducers. The phrase "unfocused ultrasound wave", as used herein, refers to one or more ultrasound waves that have not been designed, for example, by selection of their relative phases, to substantially interfere constructively in a selected region. The interrogation pattern is transmitted into the target region, and the transducers are utilized to detect echoes generated by scatterers in the target region in response to the interrogation pattern.

An image of the scatterers is then globally constructed based on comparison of the detected echoes and echoes predicted by the response functions. The term "globally constructing an image", as used herein, refers to computing the ultrasound image by mathematically processing echoes received from any part of an entire portion of the target region that is illuminated by the unfocused transmitted ultrasound waves, including any interferences among these echoes, without the need for beamforming. Hence, the method of the invention generates an ultrasound image of a selected target region without utilizing beamforming either in transmission of ultrasound waves into a target region or in detection and processing of echoes generated by scatterers in that region in response to the transmitted waves.

In a related aspect, an echo signal $f_n(t)$ detected by the n-th transducer of a plurality of transducers is defined in accord with the relation:

$$f_n(t) = \int_v F_n(t, v) dv$$

wherein v represents a selected region to be imaged, v represents a particular location in the selected region v, and $F_n(t, v)$ represents a function predicting echo signal that is reflected by scatter at point v and detected by the n-th transducer.

In many embodiments of the invention, a linear model is utilized for predicting echoes detected by each transducer. For example, an echo signal $f_n(t)$ detected by n-th transducer can be defined in accord with the relation:

$$f_n(t) = \int_v B_n(t, v) s(v) dv$$

wherein s(v) represents a scattering parameter of a scatterer positioned at point v in the selected region v, $B_n(t, v)$ represents a linear response function associated with the n-th transducer element corresponding to a point v in the selected region v.

In a related aspect, the echoes detected by the transducers are discretized. This discretization process can be accomplished uniformly, for example, by sampling and digitizing each echo signal at uniform temporal intervals. Alternatively, the echo signals can be discretized non-uniformly, for example, by sampling and digitizing each echo signal at temporal intervals having different durations.

For example, an echo signal associated with the n-th transducer $f_n(t)$ can be discretized into a plurality of echo signals $f_n(k)$, each of which is defined in accord with the relation:

$$f_n(k) = \int_v B_n(k, v) s(v) dv$$

wherein k is an index representing a discrete echo sample, ranging from 1 to K, and B(k, v) is the response function associated with the n-th transducer discretized using the same time intervals as the detected echo signal.

In some embodiments, the target region can be represented as a plurality of discrete portions. The discrete portions can have the same or variable sizes. Further, the discrete portions can be distributed through the target region in a uniform or non-uniform manner. In such a case, an echo $f_n(t)$ associated with the n-th transducer can be defined in accord with the relation:

$$f_n(t) = \sum_{v=1}^{V} B_n(t, v) s(v)$$

where $v$ enumerates the discrete portions ranging from 1 to V.

In a related aspect, in a method of generating an ultrasound image as described above, the model response functions are derived based on any of computational modeling, measurements using a calibration phantom, or a combination thereof. For example, the step of deriving model response functions for the transducers can include detecting, with each transducer, an echo signal from a calibration phantom in response to pre-defined excitation signals transmitted into the calibration phantom by one or more transducers. The unfocused transmitted waves are then selected to include the pre-defined signals.

In some preferred embodiments, simplification of the functional form of a response function associated with n-th receiving transducer can be achieved by modeling an echo received by this transducer in response to an interrogation pattern generated by a plurality of transmitting transducers as a sum of echo waveforms that the n-th transducer would have received if the transmitting transducers transmitted their respective waveforms one at a time. In particular, the response function $B_n(t, v)$ can be defined in accord with the following relation:

$$B_n(t, v) = \sum_{m=1}^{M} B_{nm}(t, v)$$

wherein $B_{nm}(t,v)$ is a pairwise response function representing a contribution of the m-th transmitting transducer to the echo signal detected by the n-th receiving transducer. This assumption can advantageously reduce the number of calibration steps and/or simplify analytical modeling of the response function.

In a related aspect, the invention derives a model for a response function of a transducer element analytically based on the physical properties of ultrasound propagation and reflection in the target medium. According to this model, an excitation signal $E_m(t)$ applied to the m-th transmitting transducer can result in generation of an ultrasound waveform by that transducer whose amplitude can be represented by a convolution of the excitation signal $E_m(t)$ and an impulse response function $h_m(t)$ of the transducer. The amplitude of the generated waveform can be modeled as decaying linearly with the traveled distance before it is reflected by a scatterer at location v. The reflected wave can travel back to the n-th receiving transducer and impinge upon the transducer as an incoming ultrasound wave that is detected as an echo waveform. This echo waveform can be represented as a convolution of the amplitude of the incoming ultrasound wave and an impulse response function $h_n(t)$ of that transducer. Hence, the contribution of the m-th transmitting transducer to the echo detected by the n-th receiving transducer can be determined by the following relation:

$$B_{nm}(t, v) = \frac{C_{nm}(t - \tau(m, v) - \tau(n, v))}{\tau(m, v)\tau(n, v)}$$

wherein $C_{nm}(t)$ represents a pre-defined ultrasound signal transmitted by an m-th transducer element and received by the n-th receiving transducer element (i.e., $C_{nm} = E_m * h_m * h_n$, where * denotes convolution), $\tau(m, v)$ represents a transit time of an ultrasound signal transmitted by the m-th transducer element to a point v in the target region, and $\tau(n, v)$ represents a transit time of an ultrasound signal from point v to the n-th transducer element.

In a related aspect, an analytical model can be refined by employing calibration measurements. For example, the exact nature of the signal decay with traveled distance can be established using a phantom. This hybrid approach allows refining the analytical model and reducing the number of calibration measurements required to construct the response functions for all transducers.

In other aspects, in a method of ultrasound imaging according to the teachings of the invention as described above, a matrix equation is defined to relate the discrete echo signals detected by the transducers to the scattering parameters of one or more scatterers located in the discretized portions of the target region in accord with the relation:

$$f = Bs$$

wherein f is a column vector formed by concatenation of the discrete echo signals $f_n(k)$ associated with the transducers, s is a column vector that is composed of scattering parameters corresponding to one or more scatterers located in the discrete portions of the target region, and B is a matrix that is formed by concatenating the discretized response functions $B_n(k, v)$ associated with the transducers.

In another aspect, in a method of the invention for generating an ultrasound image, subsequent to transmission of the unfocused ultrasound waves and acquisition of the echoes, the ultrasound image is globally constructed by solving a system of linear equations, such as that defined above. A solution can be obtained by utilizing a variety of techniques. For example, in some preferred embodiments, the scatter parameter vector $\hat{s}$ can be obtained by linearly combining a pre-computed matrix of reconstruction coefficients (A) with the echo signals f in accord with the following relation:

$$\hat{s} = Af,$$

An optimal reconstruction coefficients matrix A can be defined as follows $$A = (B^T B)^{-1} B^T,$$

wherein $B^T$ represents transpose of the B matrix, and $(B^T B)^{-1}$ represents an inverse of the $B^T B$ matrix. This corresponds to minimizing the differences between the detected echo signals and the ones predicted by the model.

The computations associated with reconstructing the image can be rendered more efficient by application of a transformation to the echo signals and a compensating transformation to the matrix A to define the following relation for obtaining the scattering parameter vector s:

$$\hat{s}=(AF^{-1})(Ff)$$

wherein F denotes a selected transformation, and $F^{-1}$ denotes the inverse of this transformation. The transformation F is preferably selected to decrease the number of computations needed for obtaining the ultrasound image. The (Fast) Fourier transform is one example of a suitable transformation that can be utilized in the practice of the invention.

In another aspect, the invention provides an ultrasound imaging system that includes a plurality of transducers for generating and transmitting a plurality of unfocused ultrasound excitation signals corresponding to a selected interrogation pattern into a target region in which a plurality of scatterers are disposed. The transducers can also detect echoes generated by the scatterers in response to the excitation signals. The system can further include a plurality of analog-to-digital converters associated with the transducers to sample and digitize echoes detected by the transducers to generate a plurality of discrete echo signals. It should be understood that the transmitting elements can be the same or different than the receiving elements. Further, each analog-to-digital converter is not necessarily associated with only a single receiving element. That is, each analog-to-digital converter can process echoes from several transducers and vice versa. A computational module operates on the echo signals to globally construct an image of the scatterers based on comparison of the detected echoes with echoes predicted based on model response functions for each of the transducers corresponding to the interrogation pattern. For example, the computational module can construct the ultrasound image to minimize the differences between the detected and the predicted echoes.

In another aspect, an ultrasound imaging system of the invention as described above can include a memory module for storing the echo signals and/or the pre-computed reconstruction coefficients.

In a related aspect, the computational module can mathematically process the echo signals associated with the transducers in parallel to generate a plurality of intermediate output signals that can be summed to generate the ultrasound image. Alternatively, the computational module can construct different portions of the image in parallel and combine the constructed image portions to generate the entire image.

The system can also include a transformation module that receives the echo signals and applies a selected transformation, e.g., Fourier Transform, to the echo signals prior to processing of the echo signals for image construction.

In further aspects, an ultra-sound imaging system of the invention can include a user-interface having a display for presenting the constructed ultrasound image to a viewer. The system can further include a graphical object, e.g., a window, associated with the display image for selecting a portion thereof. Upon selection of an image portion, the computational module can recompute the selected portion at a resolution that is different, e.g., higher, than that of the displayed image. The re-computed image can be presented in the portion of the display associated with the graphical object, e.g., within the window utilized to select that portion. It should be understood that more than one window can be provided in the display for selecting different portions of the image. Further, a window utilized for selecting a portion of the image can have a variety of shapes, e.g., circular, rectangular, and/or a variety of sizes. Further, a graphical object utilized for selecting a portion of the image is not limited to a window. For example, in some embodiments a cursor can be provided for selecting a pre-defined area surrounding a point to which the cursor is directed.

Further understanding of the invention can be obtained by reference to the following detailed description in conjunction with the associated drawings, which are briefly described below.

BRIEF DESCRIPTIONS OF THE DRAWINGS

FIG. 1 schematically depicts operation of an exemplary ultrasound imaging system of the invention for volumetric imaging by employing a two-dimensional transducer array in which an exemplary path of an ultrasound wave transmitted by transducer element m, reflected by a scatterer located at point v, received by element n, amplified, and digitized by an analog-to-digital converter is illustrated.

FIG. 2 illustrates exemplary matrices utilized in a linear forward model in an ultrasound imaging method according to the teachings of the invention to represent echo signals f, system response coefficients B, and scattering strength s.

FIG. 3 depicts an optimal solution according to the teachings of the invention for a linear forward model, such as that shown in the previous figure, by illustrating the relationship between the estimated scatter distribution $\hat{s}$, the reconstruction matrix $(B^T B)^{-1} B^T$ and the received echo signal f.

Figure 4:
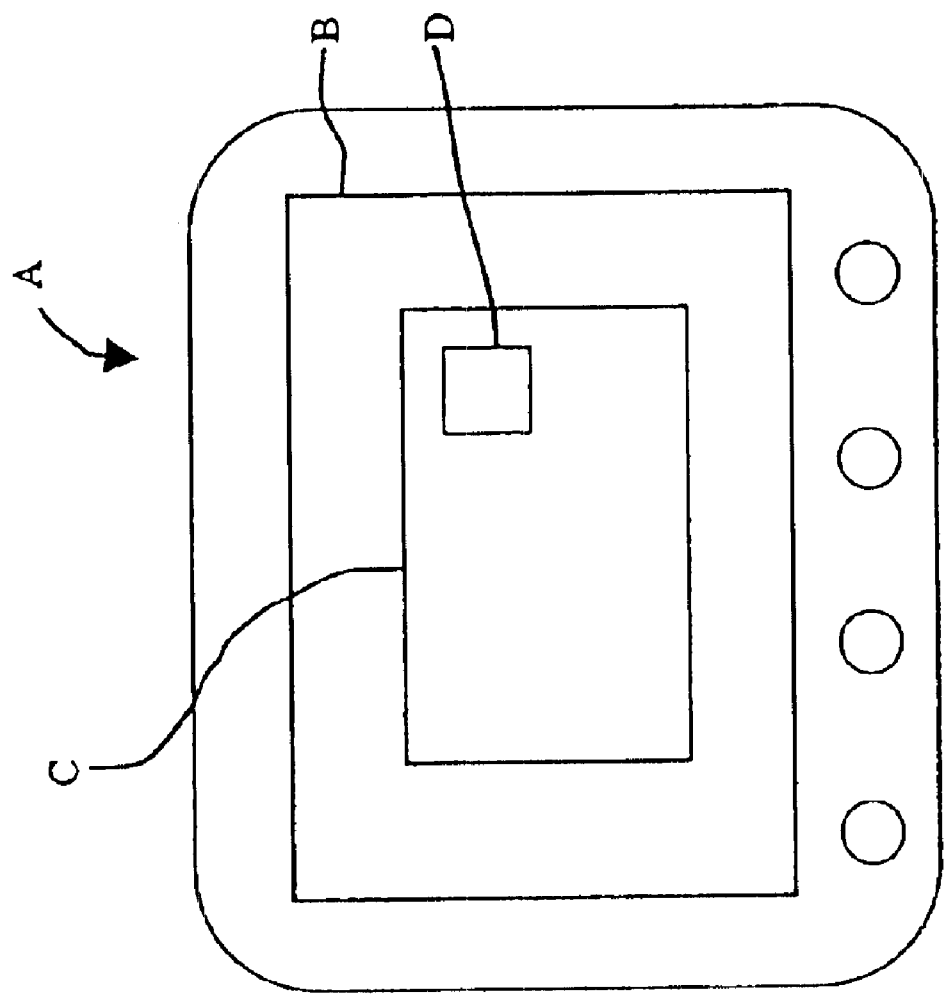

FIG. 4 schematically depicts a user interface having a display for presenting an ultrasound image constructed according to the teachings of the invention and a dynamic window associated with the display for selecting a portion of the image to be displayed at a different resolution (typically higher) than the rest of the image.

Figure 5:
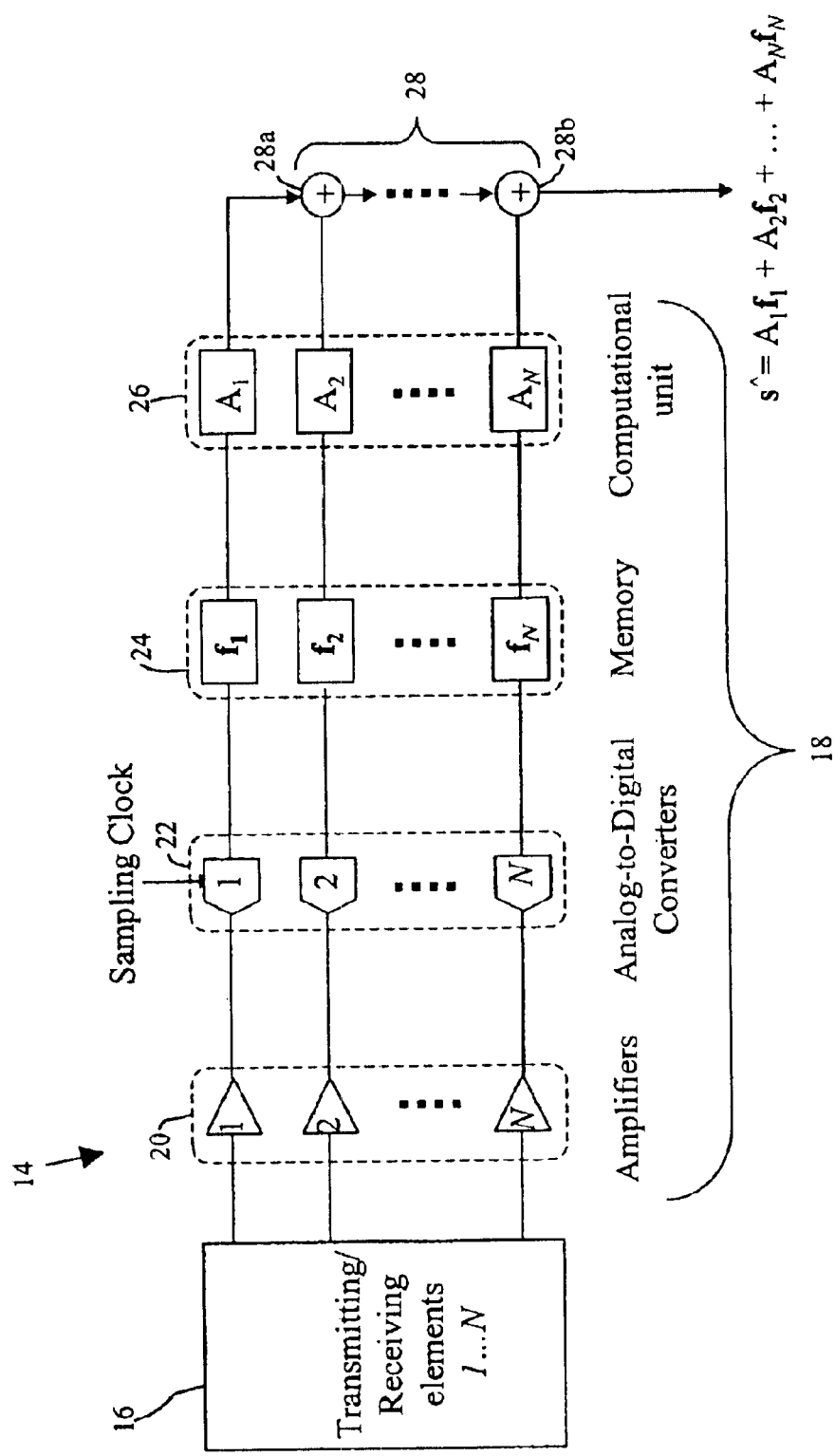

FIG. 5 illustrates an exemplary ultrasound imaging system of the invention which utilizes a plurality of transducer elements to transmit ultrasound excitation signals into a selected target region and to detect echoes generated in response to these signals, and further employs pre-loaded model response functions of the transducers obtained according to the teachings of the invention to construct an image of the target region based on the detected echoes.

Figure 6:
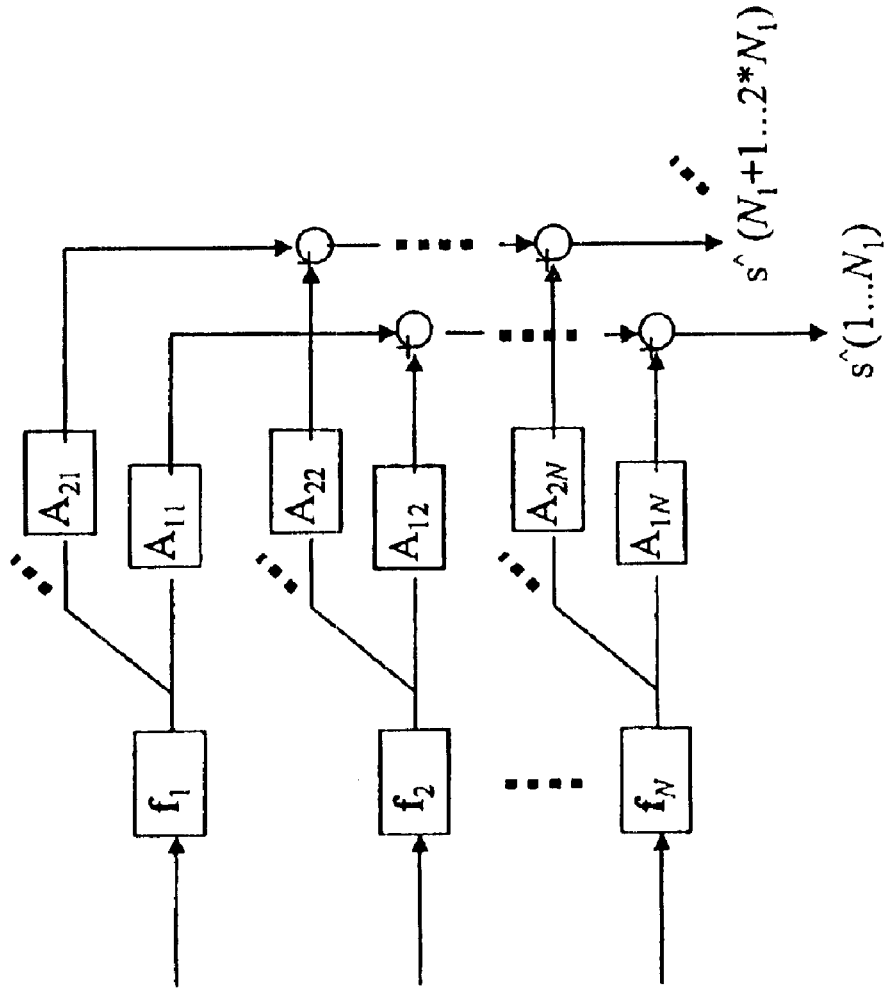

FIG. 6 illustrates an exemplary system architecture that can be utilized in an ultrasound imaging system according to the teachings of the invention for parallel processing of a plurality of receive channels by employing several computational modules in parallel for computing intermediate results corresponding to different regions of an ultrasound image, and summing the intermediate results to obtain the entire image.

Figure 7:
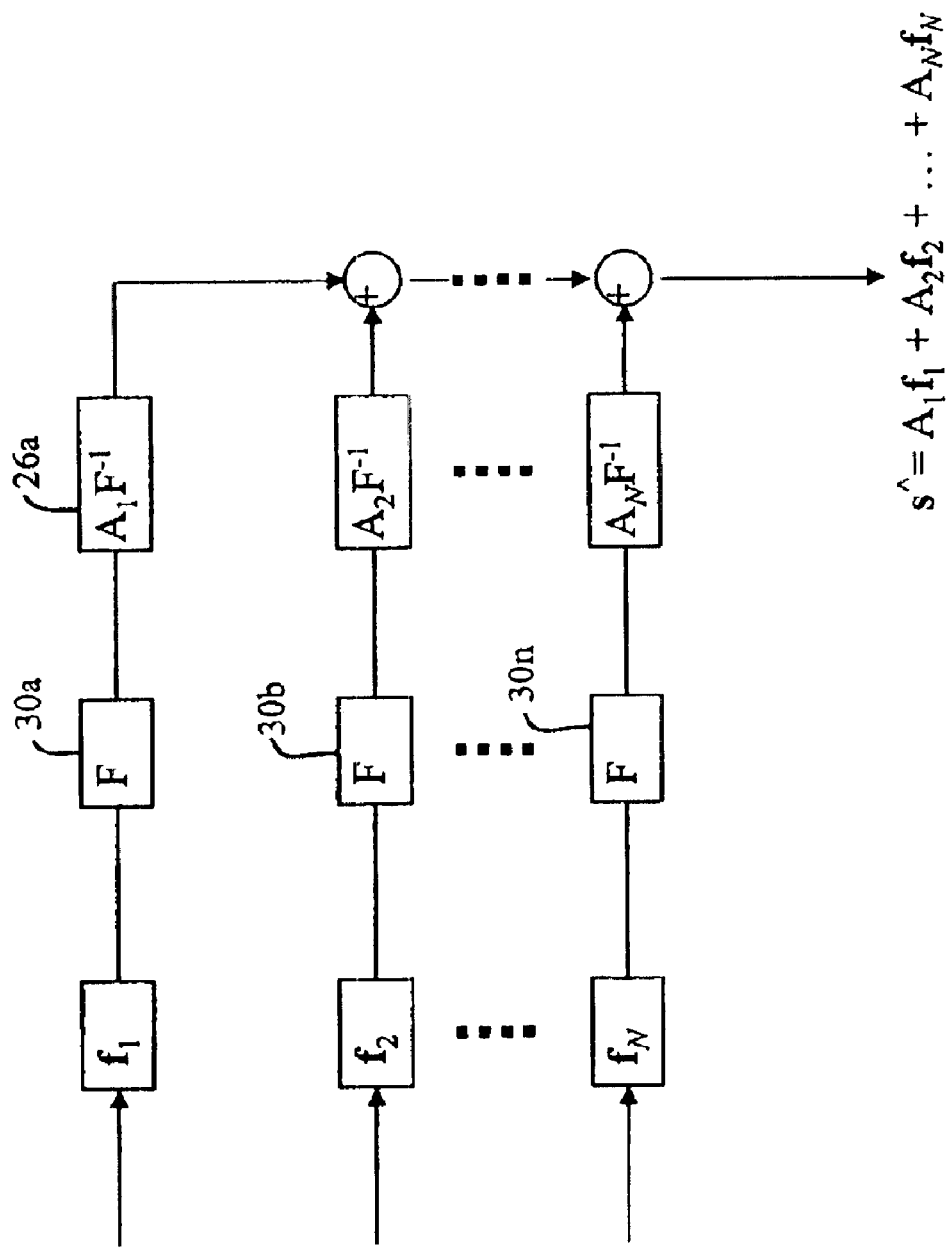

FIG. 7 illustrates an exemplary system architecture that can be implemented in an ultrasound imaging system of the invention in which each data channel is processed by a selected transformation prior to processing for image construction in order to reduce computational load.

Figure 8:
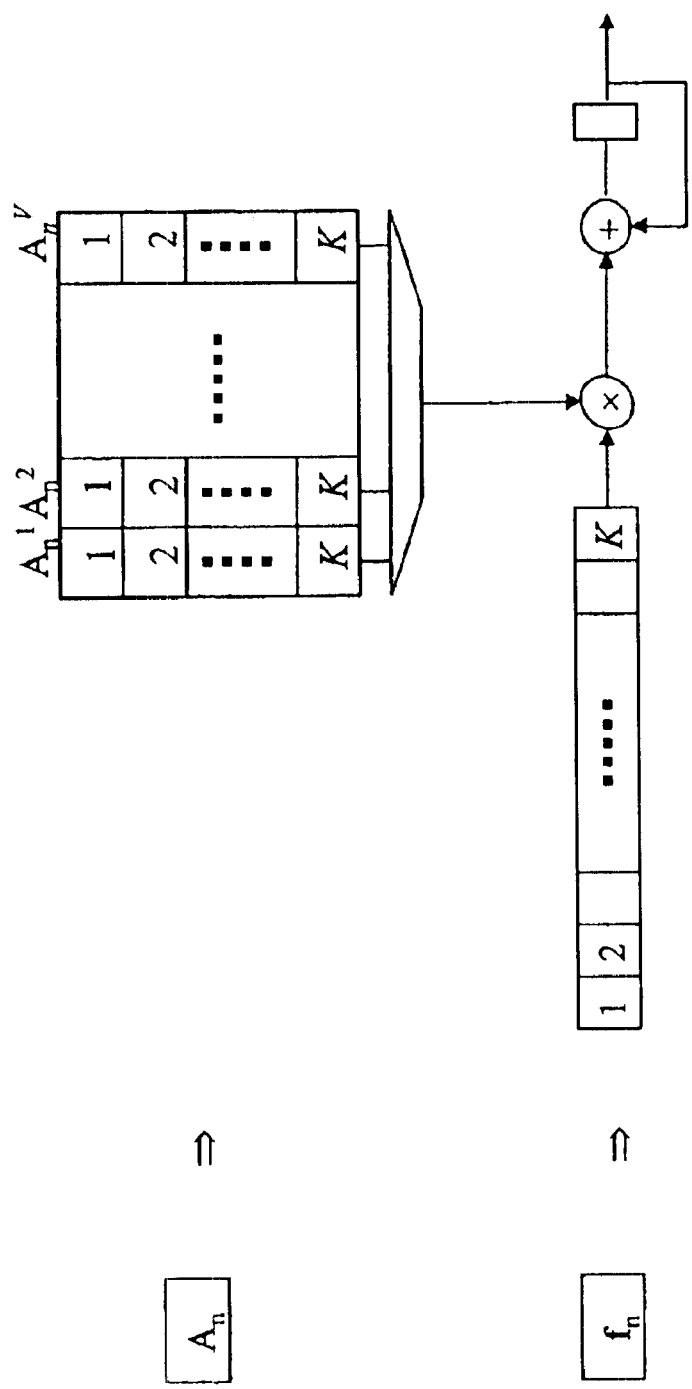

FIG. 8 schematically illustrates operation of an exemplary computational unit in an ultrasound imaging system of the invention in which a plurality of digitized echo signal $f_n$ from the receiving element n, and pre-computed matrix $A_n$ for the same receiving element are stored in memory, and the intermediate image $A_n f_n$ is computed by straightforward multiplication of the echo samples with the corresponding coefficients.

Figure 9:
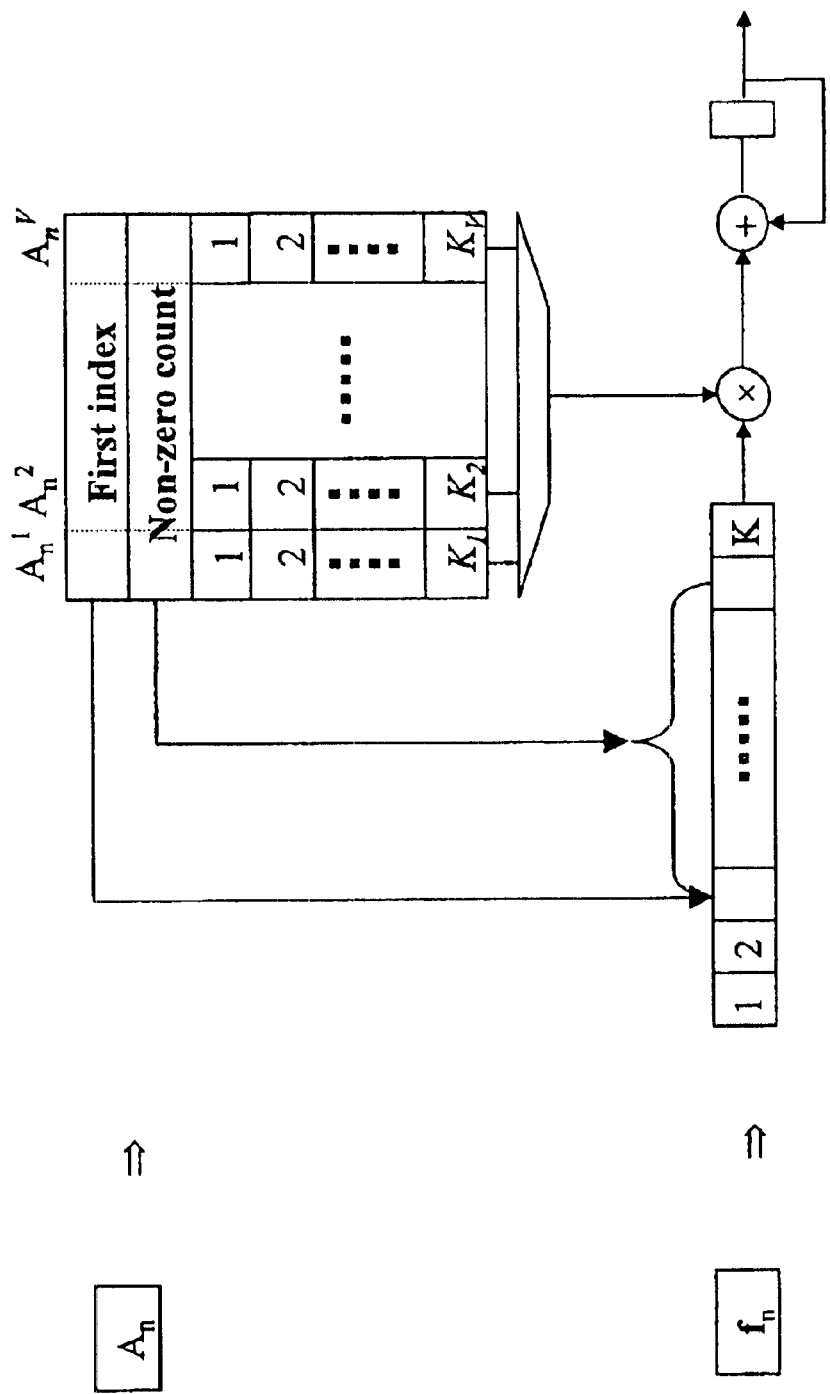

FIG. 9 schematically illustrates another implementation of a computational unit in an ultrasound imaging system of the invention in which each array of digitized echo signals $f_n$ from each receiving element n, together with non-zero elements of $A_n$ and their associated indices, are stored in memory and the intermediate image $A_n f_n$ is computed by looking up the corresponding element in the echo signal array and multiplying it with the respective non-zero coefficients of $A_n$.

Figure 10:
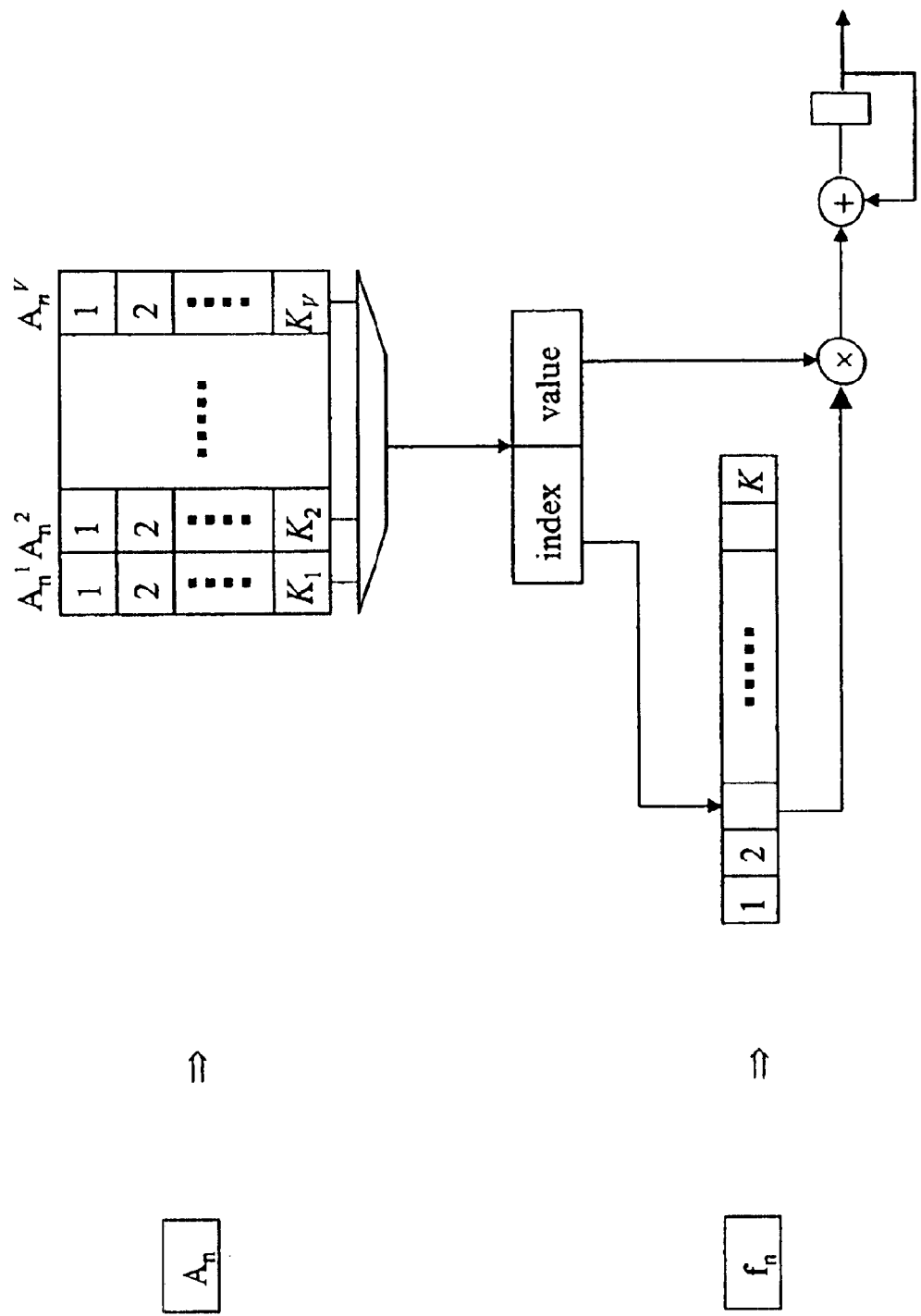

FIG. 10 schematically illustrates another implementation of a computational unit of an ultrasound imaging system of the invention in which, in addition to each digitized echo signal array $f_n$ from a receiving element n, for each row in matrix $A_n$, the first index and the total number of non-zero coefficients are stored, followed by the coefficients themselves, and the intermediate image $A_n f_n$ is computed by multiplying the row of coefficients with the corresponding sub-set of the echo signal array.

DETAILED DESCRIPTION

The present invention provides methods and systems for generating ultrasound images in real-time (e.g., 30 frames per second) without utilizing beam-forming either in transmission of ultrasound waves into a region of interest or in processing echoes received from scatterers present in this region in response to the transmitted waves.

Figure 1:
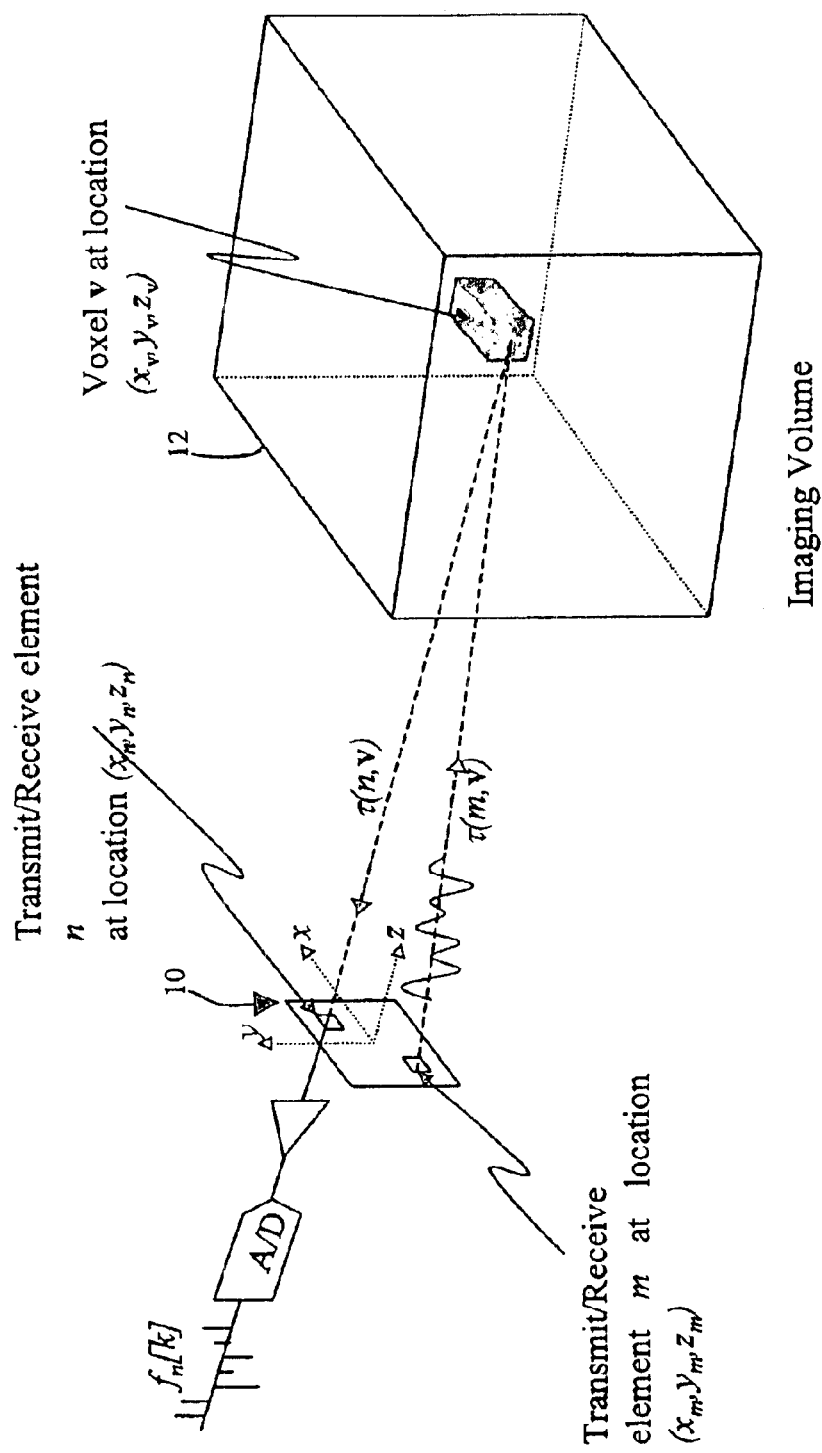

With reference to FIG. 1, in one exemplary method of the invention for generating an ultrasound image of scatterers present in a region of interest, one or more transducers 10 (e.g., M transducer elements), such as transducer element m, transmit a plurality of unfocused ultrasound waves into the region of interest, for example, the illustrated imaging volume 12. Although in this exemplary embodiment, the transducers 10 function as both transmitting and receiving elements, in other embodiments some transducers can be employed only as transmitting elements and others only as receiving elements. Alternatively, some transducers can function only as receiving or transmitting elements during a selected temporal portion of data acquisition period, and as both transmitting and receiving elements during other portions of the acquisition period. Thus, in this embodiment, each transducer can transmit an unfocused ultrasound excitation signal into a region of interest and can also receive echoes generated in response to this signal or signals transmitted by other transducers into the region. Although in this exemplary illustration, the transducers are arranged as a planar two-dimensional array, those having ordinary skill in the art will realize that other arrangements are also possible. For example, the transducers can be arranged in a linear fashion along a straight or curved line, or any other geometrical arrangement suitable for a particular application. Further, although the exemplary region of interest 12 is three-dimensional, the methods of the invention can be utilized to generate ultrasound images of scatterers present in a region having any dimensionality, e.g., two dimensions. For a distribution of scatterers, herein denoted as s(v), in the region of interest, for example the region 12, where v represents the parameterization of the space (it can be 1-, 2- or 3-dimensional space, Euclidean or polar coordinate system, or any other parameterization), an echo received by a transducer element n ($1 \leq n \leq N$) can be modeled by utilizing the following relation:

$$f_n(t) = \int_v F_n(t, v) dv, \quad (1)$$

where $F_n(t, v)$ represents a response function associated with the n-th transducer, i.e., it predicts the echo signal received by the n-th transducer that was reflected by the scatterer at location v. Under the linear model of ultrasound imaging, Equation (1) can be simplified to the following relation:

$$f_n(t) = \int_v B(t, v) s(v) dv, \quad (2)$$

where $B_n(t, v)$ represents a linear response function associated with the n-th transducer. The response function $B_n(t, v)$ represents an echo that the transducer element n would have received, in response to the transmitted ultrasound waves, from a scatterer positioned at location v and having unit scattering strength. As discussed in detail below, the present invention teaches a variety of methods for constructing the response function which include analytical modeling, empirical modeling, or a combination thereof.

In one preferred embodiment of the invention, the region of interest, e.g., the above exemplary region 12, is modeled as a plurality of discrete portions, each of which is herein referred to as a "voxel". Further, each echo received by one of the transducers is discretized, for example, by sampling and digitization, into a plurality of discrete echo signals. The discretization of an echo can be achieved either uniformly, for example, by sampling the echo at equal time intervals, or alternatively, non-uniformly, for example, by sampling and digitizing the echo at a plurality of varying time intervals. An echo received by the n-th transducer can then be represented in accord with the following relation:

$$f_n(k) = \sum_{v=1}^{V} B_n(k, v) s(v), \quad (3)$$

wherein $\upsilon$ is an index enumerating voxels, V represents the number of voxels forming the region of the interest, that is $1 \leq \upsilon \leq V$, k is an index representing a sampled echo signal, K represents the number of sampled echo signals in a received echo, that is $1 \leq k \leq K$, and $s(\upsilon)$ represents a scattering parameter, e.g., scattering amplitude associated with the $\upsilon$-th voxel. The above Equation (3) can be written in a matrix form in accord with the following relation:

$$f_n = B_n s, \quad (4)$$

wherein $f_n$ represents the vector of discrete echo signals, s represents the vector of the unknown scattering parameters associated with different voxels, and $B_n$ is the matrix of the discretized response function values $B_n(k, v)$.

With reference to FIG. 2, the echo measurements associated with all of the receiving transducer elements can be combined, e.g., concatenated, into a single vector, herein denoted as f, and the respective response function matrices of these transducers elements, such as the matrix $B_n$, can also be combined to form a composite response function matrix, herein referred to as B, to obtain a unified linear model that relates the received echo signals with the unknown scatter distribution in accordance with the following equation:

$$f = Bs. \quad (5)$$

In preferred embodiments of the invention, the number of echo samples, e.g., N×K, exceeds the number of scatter estimates V by a significant amount, thereby rendering the estimation problem over-constrained.

I. Image Reconstruction

An ultrasound image of the region of interest can be generated by obtaining a solution for the scattering parameter vector s in the above Equation (5). In many embodiments of the invention a plurality of reconstruction coefficients, herein represented by a matrix A, are pre-computed in order to reduce the amount of real-time computation and thereby facilitating fast real-time imaging. The detected echoes are then linearly combined using the pre-computed coefficients as follows:

$$\hat{s} = Af, \qquad (6)$$

where $\hat{s}$ denotes a solution for the scattering vector s, and A denotes the reconstruction matrix.

As shown in FIG. 3, in one embodiment, the reconstruction matrix A can be defined as follows in order in terms of the response function matrix B to obtain an optimal solution that minimizes the square error between echo signals predicted by vector Bs and the actually measured echo signals f:

$$A = (B^T B)^{-1} B^T, \qquad (7)$$

where $(*)^{-1}$ denotes the inverse of a matrix and $(*)^T$ denotes matrix transpose.

Thus, unlike conventional methods, in a method of the invention, a solution for the scattering parameters associated with scatterers present in the voxels forming a region of interest can be obtained by utilizing an entire set of echo signals received from the region of interest without beam forming either in transmission of ultrasound waves into the region and/or in processing the echo signals received in response to these transmitted waves.

With continued reference to FIG. 3, the response function matrices $B_n$ are constant for any particular geometry of a set of transducer elements and a given transmitted signal set. Therefore, a set of reconstruction coefficient matrices $A_n$ can be pre-computed for each receive channel in accordance with the following relation:

$$A_n = (B^T B)^{-1} B_n^T = \left( \sum_{i=1}^{N} B_i^T B_i \right)^{-1} B_n^T \qquad (8)$$

As described in more detail below, in one embodiment, these pre-computed coefficient matrices are uploaded into a memory module of a computational unit of an imaging system of the invention prior to transmission of ultrasound waves into the region of interest. Upon transmission of the waves into the region and acquisition of echo signals generated in response to the transmitted waves, an optimally reconstructed image $\hat{s}$ is recovered through a series of multiply-add operations as schematically illustrated in FIG. 3 in accordance with the following relation:

$$\hat{s}(v) = \sum_{n=1}^{N} \sum_{k=1}^{K} A_n(v, k) f_n(k). \qquad (9)$$

II. Constructing Response Functions

The quality of a constructed image depends, at least in part, on how well the response functions $B_n$ utilized to generate the image reflect the physical processes associated with ultrasound wave propagation and reflection in a region of interest. Several methods for constructing these response functions are described below.

IIa. Analytical Approach

In one embodiment, analytical modeling is employed to define a relationship between the excitation signals, the scatter in the imaged volume and the received echoes. Using superposition principle, the response function $B_n$ associated with the n-th transducer can be modeled as a sum of pairwise response functions such that each pairwise response function $B_{nm}$ defines an echo waveform detected by the transducer n in response to an ultrasound waveform transmitted by the transducer m:

$$B_n(t, v) = \sum_{m=1}^{M} B_{nm}(t, v). \qquad (10)$$

Each transmitting transducer, for example, transducer m, can be driven by a pre-defined excitation signal, for example, $E_m(t)$, to generate an echo waveform. A linear model for the transducer transfer function defines an ultrasonic waveform transmitted by a transducer element m as a convolution of the excitation signal $E_m(t)$ and the element's impulse response $h_m(t)$ in accordance with the following relation:

$$C_m^{out}(t) = [E_m * h_m](t) = \int_T E_m(T) h_m(t-T) dT, \qquad (11)$$

where * denotes convolution of two signals. Similarly, an echo signal detected by a transducer element n can be modeled as a convolution of an input ultrasound waveform $C_n^{in}(t)$ and the element's impulse response $h_n(t)$ in accordance with the following relation:

$$C_n^{echo}(t) = [C_n^{in} * h_n](t) = \int_T C_n^{in}(T) h_n(t-T) dT. \qquad (12)$$

Further, it has been shown theoretically, and demonstrated empirically, that the amplitude of an ultrasonic wave decreases with increasing distance from the source of the wave. In particular, the change in the wave amplitude can be inversely proportional to the distance traveled by the ultrasound signal. Using these properties of the ultrasonic propagation, a pairwise response function of the n-th receiving transducer element associated with the m-th transmitting transducer element can be defined as follows:

$$B_{nm}(t, v) = \frac{C_{nm}(t - \tau(m, v) - \tau(n, v))}{\tau(m, v) \tau(n, v)} \qquad (13)$$

wherein $C_{nm}(t)$, which represents the contribution of the ultrasound wave transmitted by a transducer element m to the echo detected by a transducer element n, can be defined as follows:

$$C_{nm} = E_m * h_m * h_n, \qquad (14)$$

and $\tau(m, v)$ represents the transit time of the ultrasonic wave from the transducer element m to the scatterer of unit strength positioned at the location v, $\tau(n, v)$ represents the transit time of an ultrasonic wave between the point v and the transducer element n, and * represents convolution.

A variety of different coordinate systems can be employed to parameterize the above equations. For example, the coordinates of the transducer element n can be expressed in a Cartesian coordinate system as $(x_n, y_n, z_n)$, and the coordinates of the location v can be expressed as $(x_v, y_v, z_v)$. The transit time $\tau(n, v)$ can then be expressed in accord with the following relation by utilizing these Cartesian coordinates:

$$\tau(n, v) = \frac{1}{c}\sqrt{(x_n - x_v)^2 + (y_n - y_v)^2 + (z_n - z_v)^2},\qquad(15)$$

wherein c represents the speed of sound in the medium.

The response function constructed in this section can be discretized according to a selected echo sampling protocol and voxelization of the region of interest and can be employed to construct the response function matrices $B_n$ in above Equations (3) and (4).

IIb. Calibration

In some embodiments, the response function matrices $B_n$ can be modeled theoretically, as discussed above. In other embodiments, direct measurements can provide accurate estimates of the system parameters expressed by the coefficient matrices $B_n$. More particularly, one preferred embodiment of a method of the invention for generating an ultrasound image includes a calibration step in which all pairwise interactions between the transmitting and the receiving elements are measured by employing a known target (phantom), or a set of such targets.

For example, during the calibration step, a set of known scatter distributions s(v) can be utilized in conjunction with the model of Equation (4) to estimate the matrix of coefficients $B_n$ for each receiving element of a transducer array.

While a calibration step can provide accurate estimates for the matrix of coefficients $B_n$, its implementation can require a substantial amount of time and multiple phantoms. Hence, in some embodiments of the invention, a hybrid approach is employed that derives the functional dependency between the excitation pulses and the recorded echoes analytically, and estimates the parameters of the function from calibration measurements. The measurements are essentially used to refine the analytical model.

For example, rather than performing a full calibration, the impulse response of each transducer element can be estimated by varying the excitation pulse and measuring the ultrasonic signal emitted by the transducer element. Similarly, the impulse response of each receiving element can be estimated by measuring the echo signals produced by the element in response to various ultrasonic waveforms. Moreover, the functional form of signal attenuation can be obtained by transmitting various pulses into a medium of interest, and measuring the amplitude of the wave at a plurality of locations at different distances from the transducer that generates the pulses.

III. Pulse Shape and Length and the Number of Transmit Events

In many embodiments of the invention, the number of measurements, e.g., the number of measured echo signals, is significantly larger than the number of scattering parameters. Thus, so long as the transmitted signals are not identical, the information carried by each echo signal can be utilized, together with the information carried by the other echo signals, to disambiguate contributions from different locations in the imaged region. In other words, the method of the invention can be practiced without a need for employing orthogonal or substantially orthogonal transmitted waveforms. Furthermore, standard techniques in linear algebra, including eigenvalue analysis, can be employed to estimate the stability of the linear system of equations relating the scatter parameter matrix to the reconstruction coefficients and detected echoes, thereby permitting prediction of the amount of error in the resulting scatter parameter vector as a function of the noise level present in the input signals (echoes). For example, a series of pulse shapes and lengths can be examined by constructing the coefficient matrix B and analyzing its stability to choose the most stable configuration.

Those having ordinary skill in the art will, however, appreciate that although the use of orthogonal transmitted waveforms is not necessary for practicing the method of the invention, such orthogonal or substantially orthogonal waveforms can be employed in a method of the invention, for example, to minimize the number of independent measurements.

In addition to the shape of the excitation pulses, the length of the pulses and the number of transmit events affect the number of measurements, and consequently the quality of image reconstruction. As the duration of a transmitted signal increases, the returning echoes, generated in response to the transmitted signal, carry more information about the imaged medium. However, increasing the lengths of the transmitted signals may reduce resolution and increase the extent of a zone in front of the transducer from which no imaging information can be obtained.

Hence, in some embodiments of the invention, rather than increasing the lengths of the transmitted signals, several independent transmit events are performed sequentially. The number of the transmit events can be limited by a desired frame rate and/or the depth of the imaged volume.

For any particular configuration of the transducer array, an optimal pulse length (and shape) and/or an optimal number of the transmit events can be determined either through eigenvalue analysis or can be estimated empirically in the calibration step.

IV. Computation Optimizations

In general, the number of multiply-add operations required for performing the reconstruction calculations is $K \times V \times N$, where V represents the number of voxels in an image, N is the number of the receiving elements, and K is the number of samples in each echo signal. The number of voxels in an image and the number of echo samples are typically large, thus resulting in a large number of multiply-add operations to be performed.

However, in many embodiments of the invention in which the transmitted signals are relatively short in comparison with the echo acquisition time, the coefficient matrices $B_n$ (and therefore $A_n$) are inherently sparse. This somewhat mitigates the amount of computation, reducing it to $K_1 \times V \times N$ multiply-add operations, where $K_1$ is the average number of non-zero elements in the rows of $A_n$, which is much smaller than the number of echo samples K.

In some embodiments of the invention, a further reduction in the number of multiply-add operations can be achieved by applying a transformation, e.g., Fourier Transform, to the data (received echoes) and the coefficient matrix. If the transformation of the signal can be implemented in a relatively small number of operations, the total number of operations can be reduced. For example, the above equation Equation (7) can be modified as follows:

$$\hat{s} = (AF^{-1})(Ff),\qquad(16)$$

where F is an invertible transformation matrix. The transformed coefficient matrix $(AF^{-1})$ can be pre-computed and uploaded into a computational module of an ultrasound imaging system of the invention in advance of data acquisition. In such embodiments, the total number of multiply-add operations required for image reconstruction is equal to $K_2 \times V \times N + N \times K \times L$, where $K_2$ is the average number of non-zero elements in the rows of matrix $AF^{-1}$, and L is the average number of operations required to compute an element of Ff.

One example of such transformation is the Fourier Transform, for which the transformation (Ff) can be computed by employing Fast Fourier Transform techniques in $N \times K \log(K)$ operations. The total number of operations required for reconstructing the image is then $K_2 \times V \times N + N \times K \log(K)$. Since $\log(K)$ is orders of magnitude smaller than V, the number of operations needed for image reconstruction can be substantially smaller than the original number of computational operations, if $K_2$ is smaller than $K_1$.

V. Computation Resource Allocation

As shown in the previous section, the number of operations required for image reconstruction is proportional to the number of voxels in the image. Increasing resolution leads to improved image quality, but, it requires more computation. Because the number of multiply-add operations can be limited by the frame rate requirements, it is desirable to reduce the number of operations per voxel in the image, for example, as outlined in the previous section.

Another solution utilized in some embodiments of the invention is to allocate voxels in a non-uniform manner throughout the volume of interest. One possibility is to generate a nonuniform partition of the volume of interest into voxels of different sizes at the modeling stage. For example, the center of the volume can be imaged at higher resolution than the peripheral regions. The resulting coefficients can be loaded onto the respective imaging system to be utilized during imaging. The users of the system can then position the transducer so that the center of the volume includes the region of interest.

In another embodiment, the response functions are generated for a region of interest according to the teachings of the invention, and the reconstruction coefficients are computed for the entire region at two or more resolutions. With reference to FIG. 4, a display A provided in a user interface B can be employed to present a constructed ultrasound image C to a viewer. Further, a graphical object, such as exemplary dynamic window D, can be provided in the user interface to select a portion of the displayed image, for example, by defining the boundary of an image portion, to be displayed at a different (typically higher) resolution. As the user defines a high-resolution region, a list of reconstruction voxels is created by combining all the voxels of the higher resolution model inside the window and the voxels of the lower resolution model outside the window. For many shapes of the high resolution window (circular, rectangular or other), it can be readily determined in real time whether a voxel is inside the widow as the user moves the window around.

The above methods for presenting a selected portion of an image at higher resolution relative to the other portions advantageously allow increasing image resolution in a limited region while saving substantial computational time and resources that would otherwise be needed if the resolution of the entire image were increased. As an example, consider increasing the resolution of a volumetric image by a factor of q. If the original image contained V voxels, the new image will contain $Vq^3$ voxels. Suppose that a high resolution window is created inside the volumetric image. If the linear dimensions of the window are $1/p$ of the dimensions of the original volumetric image, its volume is $1/p^3$ of the total volume. The total number of voxels in the high resolution window is $Vq^3/p^3$. The number of voxels in the peripheral area is $V(1-1/p^3)$. Consequently, the total number of voxels in the new image is $(1+(q^3-1)/p^3)$ of the original voxel count. As a concrete example, if q=2 (twice as high resolution) and p=2 (the high resolution window is half of the image linear dimension), the number of the voxels in the new image is 1.875 of that in the original volume, which is significantly smaller than $q^3=8$ increase required to reconstruct the entire volume at the higher resolution.

A similar analysis for two-dimensional images shows that increasing the resolution in the entire image will require $q^2$ times more voxels, while constructing a high resolution window will require $1+(q^2-1)/p^2$ times more voxels. For the specific example of q=2, p=2, this corresponds to 1.75 fold increase using a dynamic window as described above compared to a factor of 4 increase if the resolution of the entire image is doubled.

Thus, the use of a dynamic window having a smaller size, but a higher resolution, than the entire image provides a high degree of flexibility in allocating available computational resources depending on the requirements for image resolution by trading off the size of the window (p) and its resolution (q). Such a dynamic window can be utilizs in a variety ultrasound imaging applications. For example, an ultrasound image of a patient's heart obtained at moderate resolution may alert a medical professional to potential problems with a heart valve. In such a case, a dynamic window containing the suspect heart valve can be defined, and a high resolution of the valve within the window can be obtained by utilizing the methods described above without a need to recompute in real time an image of the entire heart at a high resolution.

VI. System Implementation

The ultrasound imaging methods of the invention, as described above, can be implemented in a variety of ultrasound imaging systems. For example, FIG. 5 illustrates an exemplary ultrasound imaging system 14 according to the teachings of the invention which includes an array of transducers 16 for transmitting a plurality of unfocused ultrasound pulses into a region of interest. In addition to transmitting ultrasound pulses, the transducers 16 function as receiving elements for detecting echoes generated by scatterers present in the region of interest in response to the transmitted pulses. The exemplary imaging system 14 further includes a receive interface module 18 having a plurality of amplifiers 20 for amplifying the received echoes, and one or more analog-to-digital converters 22 for sampling and digitizing the amplified echoes to generate a plurality of discrete echo signals $f_n(k)$. The system further includes at least one memory module 24 for storing the echo signals and a plurality of pre-computed coefficients $A_n(k, \upsilon)$. A computational module 26 can perform multiply-add operations required by the image reconstruction methods of the invention. The exemplary system 14 can also include one or more processor units 28 for processing, e.g., summing, the intermediate results of the multiply-add operations. The computational module can be implemented, for example, as a general purpose computer, a Field Programmable Gate Array (FPGA) compute element, a Digital Signal processor (DSP), or a specially built integrated circuit.

FIG. 5 schematically depicts one exemplary computational technique employed by the computational module 26 for calculating the above Equation (9). Each of the echo signals $f_1, f_2, \ldots, f_N$ is received from one of the receive channels associated with one of the transducers 16, and is typically represented as a vector having a plurality of elements, each of which represents a digitized echo signal. The echo signals $f_1, f_2, \ldots, f_N$ are processed in parallel by a plurality of computing elements $A_1, A_2, \ldots, A_N$ of the computational modules 26. In particular, each computing element can implement the $A_n f_n$ operation for each receive channel. The partial results are then summed to produce the resulting image.

The physical boundaries between the computational units are not necessarily aligned with the logical boundaries of the processing of the received echoes. For example, FIG. 6 demonstrates an embodiment that employs several computational units to process one memory component corresponding to a single receive channel. For example, exemplary computational units $A_{11}$ and $A_{21}$ process the echo signal $f_1$ while computational units $A_{12}$ arid $A_{22}$ process the echo signal $f_2$. In this exemplary architecture, different areas of the image are computed in parallel by a set of computational units associated with each receive channel. For example, the outputs of one set of the computational units, e.g., exemplary units $A_{11}, A_{12}, \ldots, A_{1N}$, are summed to compute one portion of the image, herein represented by $\hat{s}(1, \ldots, V_1)$, and the outputs of another set of the computational units, e.g., exemplary units $A_{21}, A_{22}, \ldots, A_{2N}$, are summed to compute another portion of the image, herein represented by $\hat{s}(_1+, \ldots, V_1+V_2)$ and so on. These computed portions are then combined to construct the entire image.

Alternatively, several receive channels can be processed by a single processor element, depending on the bandwidth capability of each processing element. Moreover, those having ordinary skill in the art will appreciate that the general configuration of an ultrasound imaging system of the invention can be different from that described above so long as the system is capable of performing the multiply-add operations required by the image reconstruction method of the invention.

The system architecture described above can be readily modified to implement the reconstruction method defined by Equation (16). For example, with reference to FIG. 7, a transformation unit, such as units 30a, 30b, . . . , 30n, can be inserted in each receive channel to process each echo signal, e.g., signal $f_1$, for each receive channel prior to processing of the echo signals by a respective computational unit. For example, the illustrative transformation unit 30a effects a transformation of the echo signal vector $f_1$, e.g., the Fast Fourier transformation, and the computational unit 26a processes the transformed echo signal in accord with the relation defined by Equation (16). The outputs of the computational units can be summed to generate the entire image.

FIG. 8 schematically illustrates an exemplary implementation of the computations performed by a computational unit of an ultrasound imaging system of the invention. In this exemplary approach, for each echo signal vector $f_n$, each row of a reconstruction coefficient matrix $A_n$ containing the respective preloaded reconstruction coefficients is multiplied by the echo signal vector to generate an intermediate result which is added to an intermediate result obtained by multiplication of the next row with the echo signal vector, to provide an output value corresponding to the respective receive channels.

As discussed above, the reconstruction coefficient matrices $A_n$ are typically sparse, i.e., they contain many zero elements. Accordingly, as shown schematically in (FIG. 9), an alternative implementation stores only the non-zero elements and their associated indices and utilizes a look-up scheme to perform the multiplication of the non-zero elements of each row with the respective elements of the $f_n$ echo signal vector. Similar to the previous implementation, the intermediate values obtained by processing successive rows of the matrix are summed to generate an output value corresponding to the respective receive channel.

Matrix $A_n$ is often band-diagonal, which allows for an even more efficient implementation, schematically depicted in FIG. 10. In this implementation, a first index indicating the position of the first non-zero element in a row and the number of non-zero elements in that row are stored for every row of matrix $A_n$, followed by the non-zero elements themselves. This implementation lends itself naturally to a general architecture such as that in FIG. 5, as well as the ones shown in FIG. 6 and FIG. 7.

Those having ordinary skill in the art will appreciate that various modifications can be made to various embodiments of the invention as described above without departing from the scope of the invention.

What is claimed is:

1. A method of generating an ultrasound image of a plurality of scatterers disposed in a target region, comprising
constructing response functions for each of one or more transducers for a given ultrasound interrogation pattern and a given distribution of scattering media, the interrogation pattern being a set of unfocused ultrasound waves generated by one or more of the transducers,
transmitting the interrogation pattern into a target region,
utilizing said transducers to detect echoes generated by scatterers in the target region in response to the interrogation pattern, and
globally constructing an image of said scatterers based on comparison of the detected echoes and echoes predicted by the response functions.

2. The method of claim 1, wherein an echo $f_n(t)$ detected by an n-th transducer of said transducers is defined in accord with the relation:

$$f_n(t) = \int_v F_n(t, v) dv$$

wherein
v represents said selected region,
v represents a point in said region v, and
$F_n(t, v)$ represents a function predicting echoes generated by scatter at location v in said region v and detected by the n-th transducer.

3. The method of claim 1, wherein an echo signal $f_n(t)$ detected by an n-th transducer of said transducers is defined in accord with the relation:

$$f_n(t) = \int_v B_n(t, v) s(v) dv,$$

wherein
s(v) represents a scattering parameter of a scatterer positioned at point v in said region, and
$B_n(t, v)$ represents a linear response function associated with the n-th transducer element corresponding to a point v in said region.

4. The method of claim 3, further comprising modeling the response function $B_n$ in accordance with the relation:

$$B_n(t, v) = \sum_{m=1}^{M} \frac{[E_m * h_m * h_n](t - \tau(m, v) - \tau(n, v))}{\tau(m, v)\tau(n, v)}$$

wherein
$E_m(t)$ represents a pre-defined excitation signal applied to the m-th transducer for generating an unfocused ultrasound wave, $h_m(t)$ and $h_n(t)$ represent the impulse response functions of the transducers m and n respectively, τ(m, v) represents a transit time of an ultrasound signal transmitted by the m-th transducer element to a point v in said selected region, and τ(n, v) represents a transit time of an ultrasound signal from point v to said n-th transducer element.

5. The method of claim 1, further comprising discretizing each of said echoes into a plurality of sampled echo signals.

6. The method of claim 5, wherein each of said discrete echo signals is defined in accord with the relation:

$$f_n(k) = \int_v B_n(k, v) s(v) dv$$

wherein $f_n(k)$ represents k-th discrete echo signal detected by an n-th transducer of said transducers, and $B_n(k, v)$ represents a linear response function $B_n(t,v)$ associated with the n-th transducer corresponding to a point v in said region and sampled at a time corresponding to the k-th sampled echo signal.

7. The method of claim 6, further comprising representing said region as a plurality of discrete portions and defining said discrete echo signals in accord with the relation:

$$f_n(k) = \sum_{v=1}^{V} B_n(k, v) s(v)$$

wherein

υ represents one of said discrete portions,

V represents the number of said discrete portions, and s(υ) represents scattering parameter associated with scatter in the υ-th discrete portion.

8. The method of claim 7, further comprising defining a matrix equation relating the discrete echo signals detected by said transducers to the scattering parameters of one or more scatterers located in said discrete portions of said region in accord with the relation:

$$f = Bs$$

wherein f is a column vector composed of concatenation of the discrete echo signals $f_n(k)$ associated with said transducers, s is a column vector composed of scattering parameters s(υ) corresponding to scatterers located in said discrete portions of the selected region, and B is a matrix composed of concatenation of the linear response functions of said transducer elements.

9. The method of claim 8, further comprising selecting any of an echo sampling rate for generating said discrete echo signals, a number of transmitting transducers, duration of transmitted ultrasound waves, or a combination thereof such that a number of discrete echo signals is larger than a number of scattering parameters.

10. The method of claim 8, wherein the step of globally constructing an image comprises generating an estimated scatter parameter vector ŝ in accord with the relation:

$$\hat{s} = Af$$

wherein

A is a matrix of reconstruction coefficients, and f is the vector of concatenated echo signals.

11. The method of claim 10, further comprising defining the reconstruction coefficients matrix A in accord with the relation:

$$A = (B^T B)^{-1} B^T$$

wherein $B^T$ represents transpose of the B matrix, and $(B^T B)^{-1}$ represents an inverse of the $B^T B$ matrix.

12. The method of claim 11, further comprising constructing at least two different reconstruction coefficient matrices A such that the number of discrete portions in the images representing said region associated with one of said reconstruction coefficient matrices is different than the respective number of discrete portions associated with the other reconstruction coefficient matrix.

13. The method of claim 12, further comprising generating an image of said target regions by combining selected portions of one of said two images with selected portions of the other image.

14. The method of claim 10, wherein the matrix A is a sparse matrix.

15. The method of claim 10, further comprising transforming the matrix of echo signals by an invertible transformation.

16. The method of claim 15, wherein the step of globally constructing an image further comprises solving for the scattering parameter vector s in accord with the relation:

$$\hat{s} = (AF^{-1})(Ff)$$

wherein F denotes an invertible matrix such that matrix $AF^{-1}$ includes less elements than matrix A.

17. The method of claim 16, further comprising selecting the transformation F to be Fourier transform.

18. The method of claim 16, further comprising selecting the transformation F be fast Fourier transform.

19. The method of claim 1, further comprising representing said selected region as a plurality of discrete portions.

20. The method of claim 5, wherein an echo $f_n(t)$ detected by an n-th transducer of said transducers is defined in accord with the relation:

$$f_n(t) = \sum_{v=1}^{V} B_n(t, v) s(v)$$

wherein

υ represents one of said discrete portions,

V represents the number of said discrete portions, s(υ) represents scattering parameter associated with scatter in the υ-th discrete portion, and $B_n(t, v)$ represents a linear response function associated with the n-th transducer element corresponding to a point v in said region.

21. The method of claim 1, wherein the step of constructing response functions is based on any of computational modeling, measurements using a calibration phantom, or a combinations thereof.

22. The method of claim 1, wherein the step of constructing response functions further comprises constructing the response function of at least one of said transducers as a sum of pairwise response functions each representing the response of said transducer to a waveform present in said interrogation pattern and generated by another transducer independent of the response of said at least one transducer to other waveforms present in the interrogation pattern.

23. The method of claim 1, further comprising modeling an ultra-sound waveform $C_m^{out}(t)$ transmitted by an m-th transducer of said transducers as a convolution of an excitation signal $E_m(t)$ applied to the m-th transducer and an impulse response function $h_m(t)$ of the transducer element in accordance with the relation:

$$C_m^{out}(t)=[E_m * h_m](t)=\int_T E_m(T)h_m(t-T)dT.$$

24. The method of claim 1, further comprising modeling an echo signal $C_n^{echo}(t)$ detected by an n-th transducer of said transducers as a convolution of an input ultrasound waveform $C_n^{in}(t)$ and an impulse response function $h_m(t)$ of the transducer element in accordance with the relation:

$$C_n^{echo}(t)=[C_n^{in} * h_n](t)=\int_T C_n(T)h_n(t-T)dT.$$

25. The method of claim 1, further comprising modeling a decay of an amplitude of each of said ultrasound waves with the distance traveled by the wave as being inversely proportional to any of distance or time traveled by the wave.

26. The method of claim 1, wherein the step of constructing response functions for the transducers comprises detecting, with each transducer, an echo signal from a calibration phantom in response to pre-defined excitation signals transmitted into the calibration phantom.

27. The method of claim 26, wherein said unfocused transmitted waves are selected to comprise said pre-defined signals.

28. The method of claim 26, further comprising selecting the calibration phantom to comprise a plurality of discrete elements.

29. The method of claim 1, further comprising measuring an amplitude of an ultrasound wave transmitted by each of the transducers in response to a pre-defined excitation signal in the target region.

30. The method of claim 1, further comprising measuring decay rate of one or more of said unfocused ultrasound waves in the target region.

31. The method of claim 1, wherein the step of globally constructing an image comprises obtaining scattering parameters associated with said scatterers by minimizing a difference between the detected echoes and echoes predicted by the response functions.

32. The method of claim 1, wherein the step of globally constructing an image comprises obtaining scattering parameters associated with said scatterers by minimizing a difference between detected echoes and echoes predicted by a linear model of said response functions.

33. An ultrasound imaging system, comprising
one or more ultrasound transducers for transmitting an interrogation pattern comprising unfocused ultrasound waves into a target region in which a plurality of scatterers are disposed, said transducers detecting echoes generated by said scatterers in response to said transmitted excitation signals,
one or more analog-to-digital converters for digitizing said detected echoes into a plurality of discrete echo signals, and
a computational module that receives said echo signals and globally constructs an image of said scatterers based on comparison of the detected echo signals and echo signals predicted based on model response functions for each of the transducers for said ultrasound interrogation pattern.

34. The ultrasound imaging system of claim 33, wherein the computational module globally constructs the image by choosing scattering parameters associated with said scatterers so as to minimize differences between the detected and the predicted echo signals.

35. The ultrasound imaging system of claim 33, wherein the computational module employs reconstruction information computed based on said response functions to construct the image.

36. The ultrasound imaging system of claim 35, further comprising a memory module for storing said reconstruction information based on said response functions.

37. The ultrasound imaging system of claim 33, further comprising a memory module for storing said detected echoes.

38. The ultrasound imaging system of claim 33, wherein the computational module processes the echo signals associated with said transducers in parallel to generate a plurality of intermediate output signals and sums said intermediate output signals to generate the ultrasound image.

39. The ultrasound imaging system of claim 33, wherein the computational module constructs different portions of the image in parallel and combines the constructed image portions to generate the entire image.

40. The ultrasound imaging system of claim 33, further comprising a transformation module for receiving said echo signals and applying a selected transformation to said echo signals.

41. The ultrasound imaging system of claim 40, wherein said selected transformation is the Fourier Transform.

42. The ultrasound imaging system of claim 40, wherein said selected transformation is the Fast Fourier Transform.

43. The ultrasound imaging system of claim 33, further comprising a user interface having a display for presenting the constructed ultrasound image.

44. The ultrasound imaging system of claim 43, further comprising a graphical object associated with said displayed image for selecting a portion thereof.

45. The ultrasound imaging system of claim 44, wherein said computational module computes a portion of the image corresponding to the selected portion of the displayed image at a resolution different from that of the displayed image.

46. The ultrasound imaging system of claim 45, wherein said graphical user interface is a window and said portion of the image computed at a different resolution is displayed in said window.

* * * * *